United States Patent
Takahashi et al.

(10) Patent No.: US 7,172,671 B2
(45) Date of Patent: Feb. 6, 2007

(54) METHOD OF MANUFACTURING FRICTION PLATE

(75) Inventors: Rikiya Takahashi, Shizuoka (JP); Tomoyoshi Tamura, Shizuoka (JP)

(73) Assignee: NSK-Warner Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/998,641

(22) Filed: Nov. 30, 2004

(65) Prior Publication Data

US 2006/0113023 A1 Jun. 1, 2006

(51) Int. Cl.
*B32B 37/00* (2006.01)
(52) U.S. Cl. ............................... 156/275.5; 156/275.7; 156/281
(58) Field of Classification Search ............... 156/73.1, 156/278, 279, 281, 580.1, 580.2, 261, 272.2, 156/275.5, 275.7, 379.6, 379.8, 583.1
See application file for complete search history.

(56) References Cited

U.S. PATENT DOCUMENTS 4,750,955 A * 6/1988 Haguenier ................... 156/69

6,276,419 B1 * 8/2001 Maruyama ................... 156/358

FOREIGN PATENT DOCUMENTS

JP 2002-327782 * 11/2002
JP 2002-327782 A 11/2002

* cited by examiner

*Primary Examiner*—James Sells
(74) *Attorney, Agent, or Firm*—Sughrue Mion, PLLC

(57) ABSTRACT

A core plate 1, which has been punched in a core plate punching step 20, is conducted a surface roughing step 30 and a cleaning step 40. After coating both surfaces of the core plate 1 with adhesive in an adhesive coating step 50, the core plate 1 is put on a friction member 2, which has been punched in a friction member punching step 60, in a piling step 70, and a piled body 3 is conveyed to a drying and curing step 80. The core plate 1 is heated by high-frequency heating to dry and cure the adhesive. The core plate 1 and the friction member 2 are heated and pressured by the hot press 91, and the friction plate 4 is completed. Since high-frequency heating is adopted, an apparatus can be downsized, working time can be reduced and production efficiency can be enhanced.

8 Claims, 5 Drawing Sheets

METHOD OF MANUFACTURING FRICTION PLATE

BACKGROUND OF THE INVENTION

1. Field of the Invention

The present invention relates to a method of manufacturing a friction plate used for an automatic transmission. More particularly, the present invention relates to a method of drying and curing adhesive.

2. Description of the Related Art

When manufacturing a friction plate by making a friction member adhere onto a core plate, in conventional, an adhesion face is made to be rough for increasing an adhesive strength of the friction member, and further, as a pretreatment process to be conducted before degreasing and cleaning, sand blasting, degreasing by alkaline detergent, pickling by sulfuric acid and neutralization by a neutralizer is conducted.

However, when blasting is conducted on the core plate, the core plate tends to be deformed easily. Further, the peripheral devices tend to be abraded by powder used in the process of blasting. Further, importance has been recently attached to the environmental problems. Therefore, it is desired to develop a means for replacing the above pretreatment means.

In order to solve the above-mentioned problems, various inventions, for example Japanese Patent Unexamined Publication no. JP-A-2002-327782, have been accomplished.

FIG. 6 is a view showing a flow 10C of the conventional manufacturing process described in the above related art. Reference numeral 30 denotes a surface roughing step in which the surface of a core plate is roughed. In this surface roughing step, the core plate 1, which has been punched into a predetermined shape, is supplied to the conveyer 32 as shown by the arrow 31 and then one side of the core plate 1 is buffed by the buffing roller 34. Successively, the core plate 1 is attracted by the conveyer 33 which is magnetized, and the other side of the core plate 1 is buffed by the buffing roller 34. After that, the core plate 1 is demagnetized by the demagnetizer 35 and sent to the cleaning step 40.

Reference numeral 41 defines a rough cleaning step, reference numeral 42 defines a finishing cleaning step, and reference numeral 43 defines a drying step. Reference numeral 44 defines a shower of cold or hot water, reference numeral 45 defines a nylon brush, reference numeral 46 defines a finishing shower of cold or hot water, reference numeral 47 defines a nozzle of compressed air for removing water, and reference numeral 48 defines a roller conveyer for conveying the core plate. When the core plate is buffed as described above, a surface thereof is slightly scraped so that the adhesive face can be roughed and oil adhered thereto can be simultaneously removed. Therefore, it is possible to omit the steps of alkaline cleaning and pickling treatment.

Reference numeral 50 defines an adhesive coating step, reference numeral 51 defines an adhesive supply pipe, and reference numeral 52 defines an adhesive tank. A set of large and small rollers 53, 54 is arranged at the upper and the lower position. Adhesive is supplied to position defined between the upper rollers 53, 54, and the lower rollers 53, 54 are dipped in the tank 52. Therefore, adhesive is held on the surfaces of the large rollers 53 so that the adhesive can be coated on both faces of the core plate 1 which passes through between the large rollers 53, 53. The small rollers 54, 54 have a function of adjusting a quantity of adhesive attaching to the large rollers 53, 53.

Reference numeral 80 defines a drying and curing step of adhesive. A blast of hot air having predetermined temperature is blown to the core plate 1, on which the adhesive is coated, and the adhesive is dried and cured in the furnace 85.

The core plate, on which the adhesive is dried and cured, is conveyed as shown by arrow 71. On the other hand, the friction member, which has been punched into a predetermined shape, is conveyed as shown by arrow 72. The core plate and the friction member are put on each other and conveyed to the main adhesion step 90.

Reference numeral 91 defines a hot press. The core plate, on which the adhesive is coated, dried and cured, and the friction member are put on each other and formed into the piled body 3. The thus formed piled body 3 is heated and pressured by the hot press 91. In this way, the complete friction plate 4 can be formed.

Even in the case of the above-mentioned conventional example, consideration is given to the environmental problems. Further, concerning the method of coating the adhesive, such a problem is solved in the conventional example that the adhesive attaches to an inner circumference of the core plate and clearance of the core plate with respect to the opponent member can not be maintained accurate. However, in the conventional method of coating the adhesive, the following problems may be encountered. Since a hot blast furnace is used for drying and curing the adhesive, it is necessary to provide a large space in which the apparatus is installed and further it takes no less than four minutes to dry the adhesive.

SUMMARY OF THE INVENTION

It is an object of the present invention to enhance the production efficiency of manufacturing a friction plate when the adhesive is dried and cured by a small-scale apparatus and further the drying and curing time is shortened.

In order to solve the above problems, the present invention provides a method of manufacturing a friction plate in which a core plate and a friction member of a predetermined shape are put on each other via adhesive and the adhesive is dried and cured, characterized in that the step of drying and curing the adhesive is conducted by means of high-frequency heating for heating the core plate which comes into contact with the adhesive.

According to the present invention, the adhesive is dried and cured by means of high-frequency heating for heating the core plate. Therefore, the adhesive can be dried and cured by a small-scale apparatus in a short period of time. Accordingly, the production efficiency can be enhanced.

DETAILED DESCRIPTION OF THE PREFERRED EMBODIMENTS

A core plate, which has been punched into a predetermined shape, is subjected to pretreatments such as surface roughing and cleaning. After that, both sides of the core plate are coated with adhesive, and then the core plate is put on a friction member which has been punched into a predetermined shape. Then, the core plate is heated by means of high-frequency heating so that the adhesive can be dried and cured. Successively, the core plate and the friction member are heated and pressured by a hot press so as to conduct the main adhesion. In this way, the friction plate is completed.

The setting of high-frequency heating can be arbitrarily determined according to size of the friction plate and characteristic of the adhesive. For example, it is preferable that the setting is determined as follows. An interval between the heating coil and the core plate is set in the range from 5 to 500 mm, the output is set in the range from 1 to 300 KW, the frequency is set in the range from 20 to 300 KHz, and the heating time is set in the range from 4 to 6 seconds.

In the case where the conventional hot blast furnace was used, it was necessary to provide an apparatus, the length of which was 10 m and the width of which was 3 m, and further it took about no less than 4 minutes for the treatment time. However, when the high-frequency heating apparatus of the present invention was used, it was sufficient to provide the apparatus, the length of which was 1 m and the width of which was 0.5 m, and further the treatment time was only about no more than 5 seconds. Therefore, the production efficiency was remarkably enhanced.

EMBODIMENTS

Figure 1:
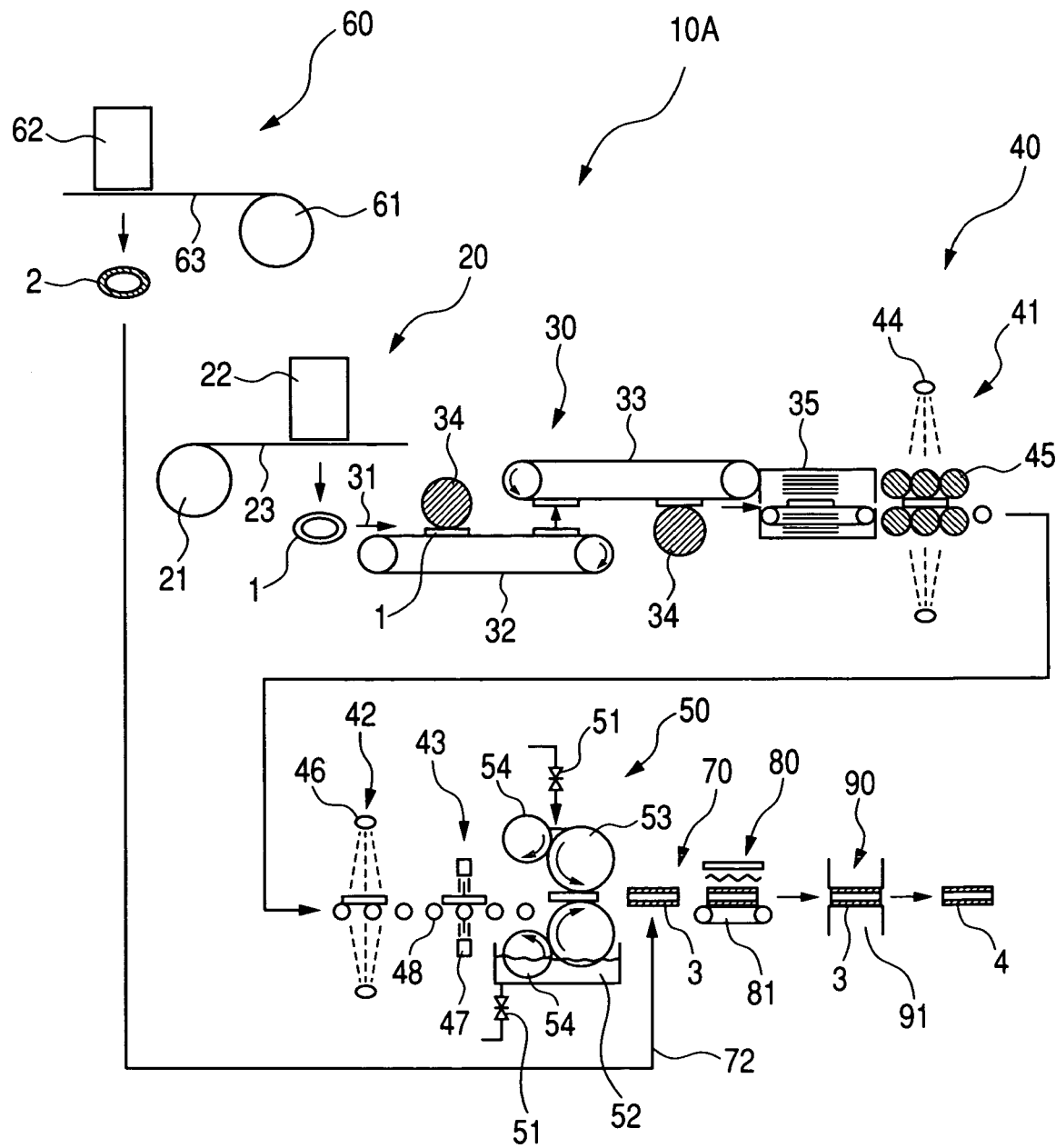
FIG. 1 is a view showing a process of a first embodiment of the present invention.

FIG. 1 is a view showing a flow 10A of the process of the first embodiment of the present invention. Reference numeral 20 defines a punching step of the core plate, reference numeral 21 defines a metallic strip roll, reference numeral 22 defines a punching machine, reference numeral 23 defines a metallic strip which has been drawn out from the metallic strip roll 21, and reference numeral 1 defines a core plate which has been punched into a predetermined shape.

Reference numeral 30 defines a core plate surface roughing step. As shown by arrow 31, the core plate 1 punched into the predetermined shape is supplied onto the conveyer 32 and the surface of the core plate 1 is roughed by the buffing roller 34. Next, the core plate 1 is attracted by the next magnetized conveyer 33, and the opposite surface of the core plate 1 is roughed by the buffing roller 34. After that, the core plate 1 is demagnetized by the demagnetizer 35 and then conveyed to the next cleaning step 40.

The material of the buffing roller is not particularly limited, however, as an example, the buffing roller is made of urethane in which abrasive grains are embedded. Due to the constitution, a quantity of the core plate to be scraped off can be suppressed to be minimum. Since the core plate surface is scraped off, it is unnecessary to provide a degreasing step and a pickling step. Further, magnetic attraction of the conveyer 33 can be accomplished by a simple means such as a means in which magnets are arranged between the conveyer belts.

The cleaning step 40 includes: a rough cleaning step 41; a finish cleaning step 42; and a drying and dehumidifying step 43. Reference numeral 44 defines a cold or hot water shower, reference numeral 45 defines a nylon brush, reference numeral 46 defines a cold or hot water shower used for finishing, and reference numeral 47 defines a compressed air nozzle for drying and dehumidifying. Reference numeral 48 defines a roller conveyer for conveying the core plate 1. The core plate 1, which has been subjected to pretreatment of surface roughing and cleaning, is conveyed the next adhesive coating step 50.

In the drawing, reference numeral 51 defines an adhesive supply pipe, reference numeral 52 defines an adhesive tank, reference numerals 53, 53 respectively define a large roller, and reference numerals 54, 54 respectively define a small roller combined with the large roller. Adhesive is supplied between the upper large roller 53 and small roller 54, and the lower rollers 53, 54 are dipped in the tank 52. The small roller 54 has a function of adjusting a quantity of the adhesive attached and held by the large roller 53. When the core plate 1 subjected to pretreatment is made to pass through between the large rollers 53, 53, both faces of the core plate 1 can be coated with adhesive.

Reference numeral 60 defines a friction member punching step. Reference numeral 61 defines a friction member roller, reference numeral 62 defines a punching machine, reference numeral 63 defines a strip of the friction member drawn out from the strip roll, and reference numeral 2 defines a friction member punched out into a predetermined shape. The friction member punched out into the predetermined shape is conveyed to the piling step 70, in which the friction member is put on the core plate 1, as shown by arrow 72.

In the piling step 70, the friction member is put on the core plate 1, on both the faces of which the adhesive is coated. In the drying and curing step 80, the core plate 1 of this piled body 3, which is contacted with the adhesive, is heated by means of high-frequency heating, so that the adhesive can be dried and cured. Finally, in the main adhesion step 90, the piled body 3 is heated and pressured by the hot press 91. In this way, the friction plate 4 is completed.

Figure 2:
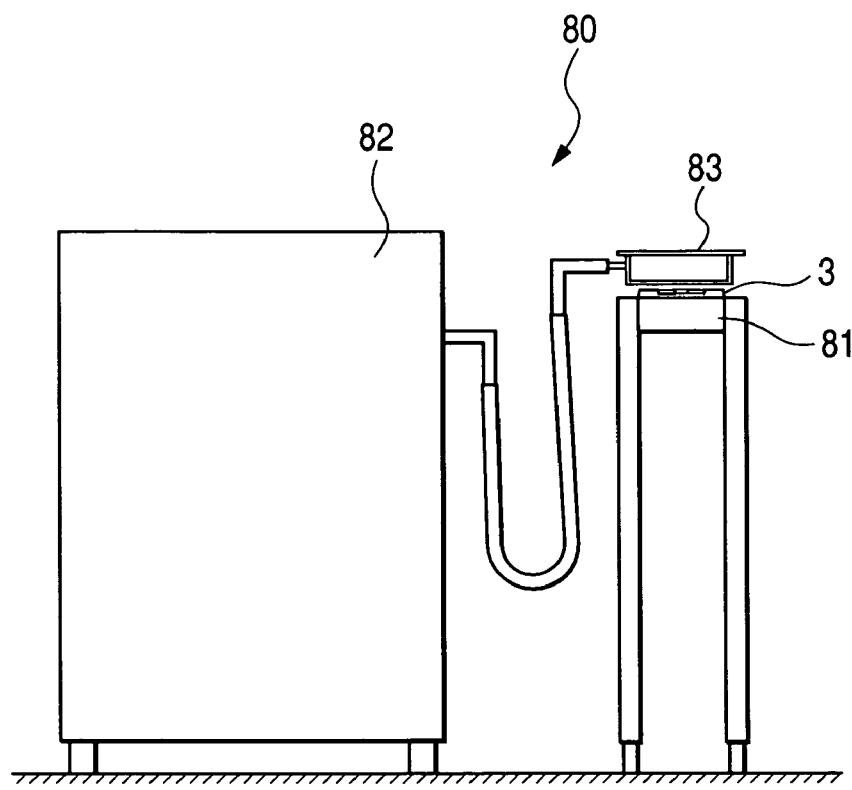
FIG. 2 is a view showing a drying and curing device of drying and curing adhesive.
Figure 3A:
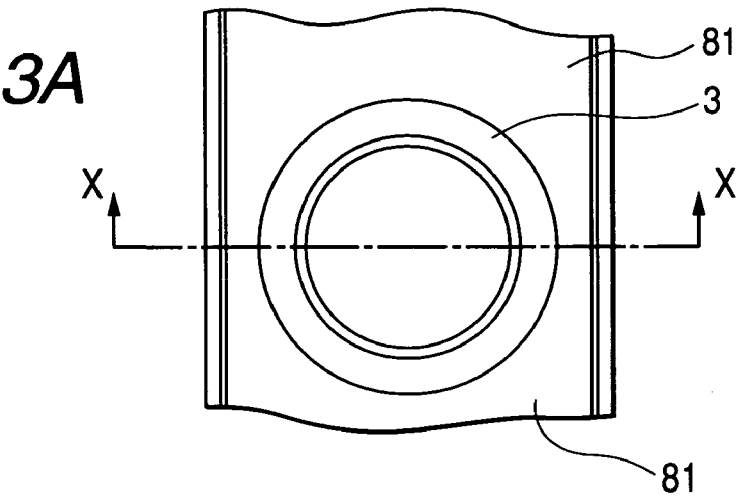
FIG. 3 is a view showing a portion of the conveyance device of the first embodiment.
Figure 3B:
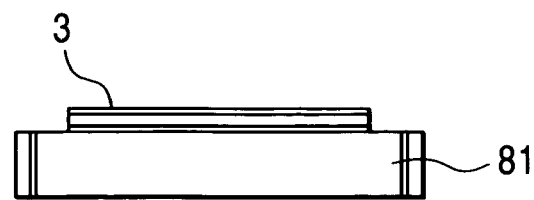

FIG. 2 is a view showing an apparatus in the drying and curing step 80. Reference numeral 82 defines a high-frequency oscillator, reference numeral 83 defines a heating coil connected to the high-frequency oscillator 82. The piled body 3, in which the core plate 1 and the friction member 2 are put on each other, is heated by means of high-frequency heating while it is being conveyed. FIGS. 3A and 3B are views showing a conveyance device. FIG. 3A is a plan view showing a state in which the piled body 3, in which the core plate 1 and the friction member 2 are put on each other, is being conveyed on the conveyor 81, and FIG. 3B is a sectional view taken on line X—X in FIG. 3A.

Figure 4:
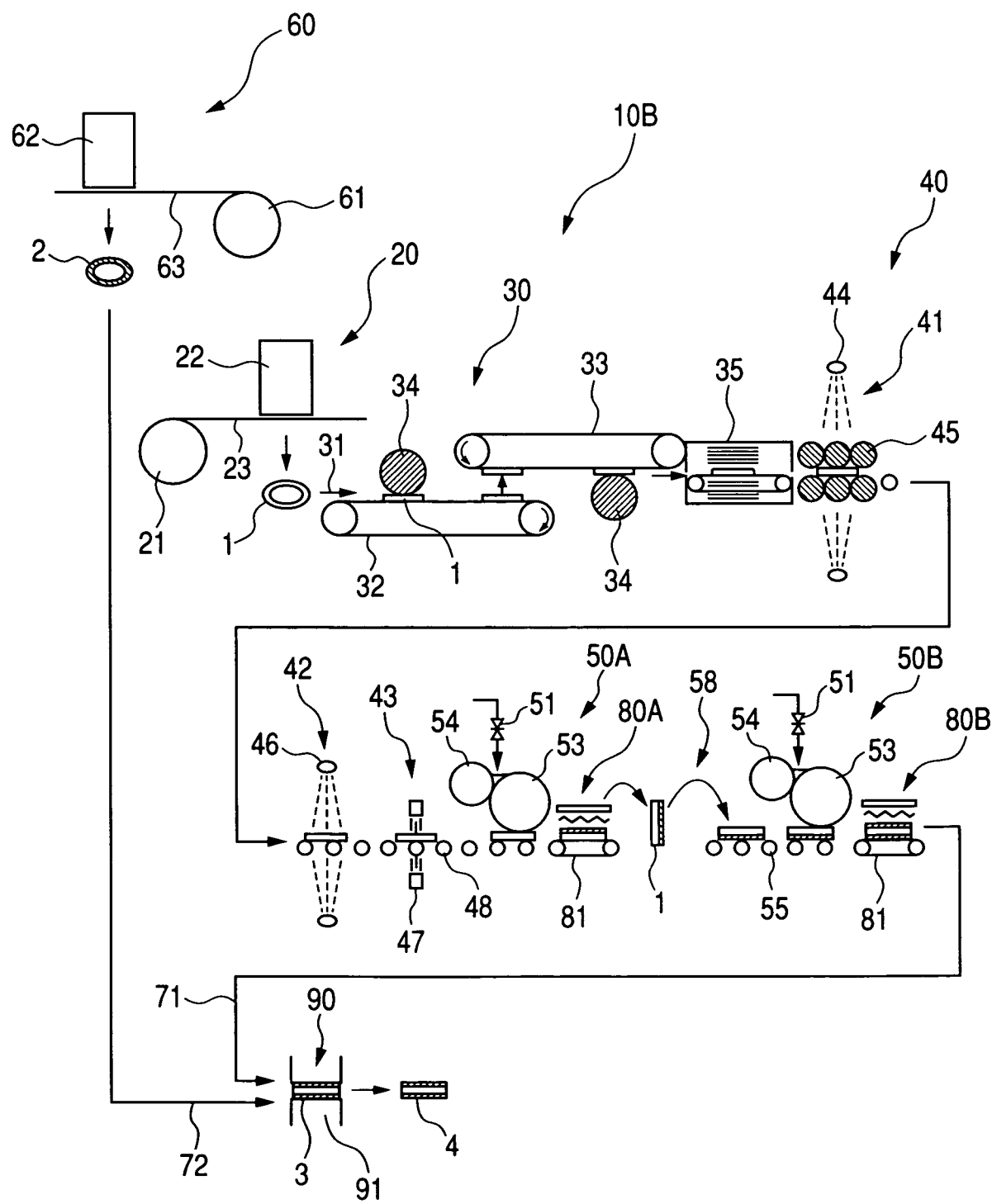
FIG. 4 is a view showing a process of a second embodiment of the present invention.

FIG. 4 is a view showing a flow 10B of the process of the second embodiment. Like reference characters are used to indicate like parts in FIGS. 1 and 4. The punching step 20 of punching the core plate 1, the punching step 60 of punching the friction plate 2, the surface roughing step 30, in which pretreatment is conducted on the core plate 1, and the cleaning step 40 of the second embodiment are the same as those of the first embodiment. Therefore, the repeated explanations are omitted here.

In the second embodiment, in the step of coating adhesive on the core plate 1 which has already been subjected to pretreatment, before the core plate is put on the friction member, one side of the core plate 1 is coated with adhesive, and then the other side of the core plate 1 is coated with adhesive. After the coated adhesive is dried and cured, the core plate is put on the friction member. That is, the core plate 1, which has been subjected to pretreatment, is conveyed to the first adhesive coating step 50A and contacted with the large roller 53 and then one side of the core plate 1 is coated with adhesive. Then, the thus coated adhesive is dried and cured in the first drying and curing step 80A. The core plate 1, in which one side thereof is coated with the adhesive, is inverted in the inversion step 58. The thus inverted core plate 1 is conveyed by the roller conveyor 55, and the other side of the core plate 1 is coated with adhesive and dried and cured in the second adhesive coating step 50B and the second drying and curing step 80B.

The core plate 1, on both the faces of which the adhesive has been coated and dried and cured, and the friction member 2, which has been punched into a predetermined shape, are put on each other as shown by arrows 71 and 72 and formed into the piled body 3. The piled body 3 is conveyed to the main adhesion step 90 and then heated and pressured by the hot press 91. In this way, the friction plate 4 is completed.

In this connection, even in the second embodiment, the constitution of the drying and curing device of adhesive is the same as that of the first embodiment.

Figure 5A:
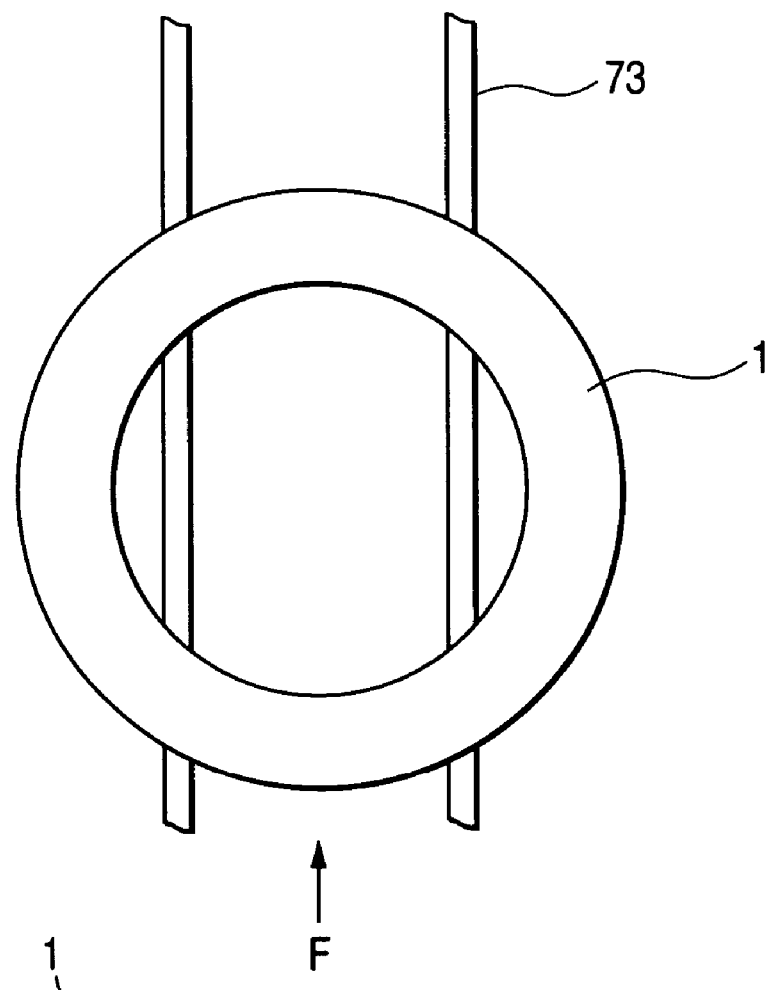
FIG. 5 is a view showing a portion of the conveyance device of the third embodiment.
Figure 5B:
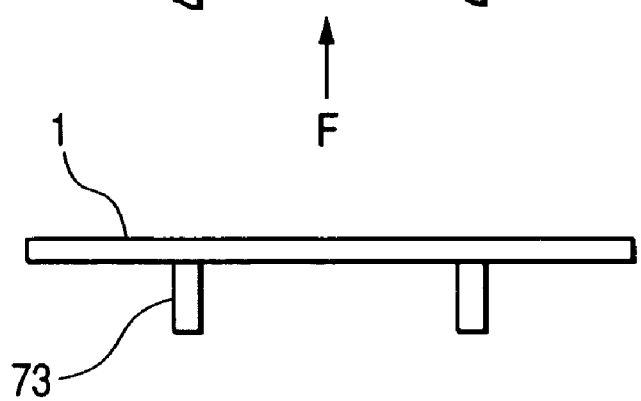
Figure 6:
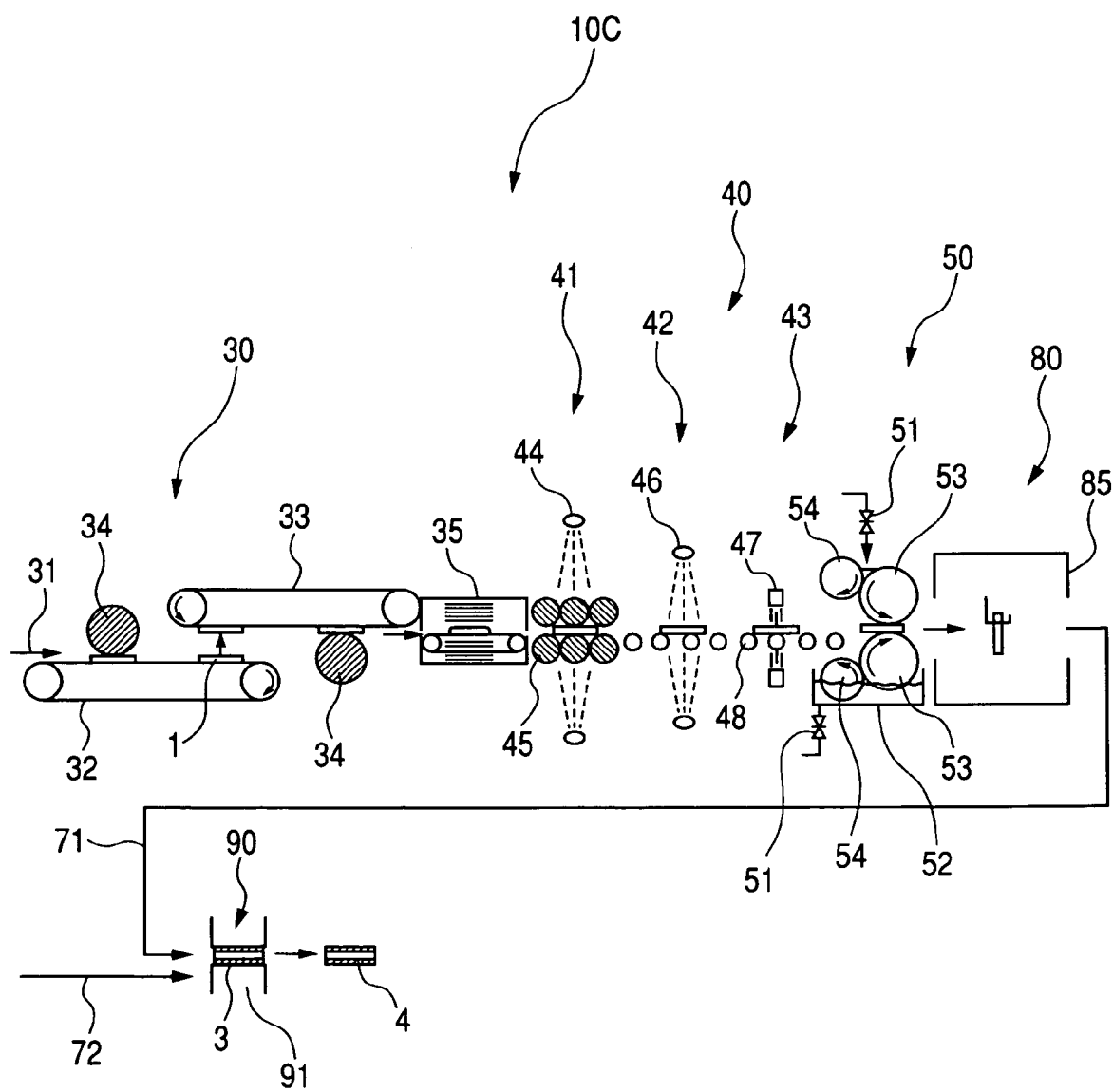
FIG. 6 is a view showing a process of the conventional example.

FIGS. 5A and 5B show the following states. In the third embodiment which is a variation of the second embodiment in which the adhesive is coated on both faces of the core plate and dried and cured and then the core plate is put on the friction member, in the drying and curing step, the core plate 1, both the faces of which are coated with adhesive, is being conveyed by the chain belt 73. FIG. 5A is a plan view, and FIG. 5B is a side view of FIG. 5A taken in the direction F.

In the third embodiment, the adhesive is coated on both faces of the core plate and dried and cured. Therefore, it is different from the second embodiment in that it is unnecessary that the core plate is inverted and the same step is repeated twice.

In this connection, in each above-mentioned embodiment, the surface of the core plate is roughed by the buffing roller. However, it should be noted that roughing the core plate surface is not limited to buffing, that is, roughing the core plate surface can be conducted by pickling or blasting.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A manufacturing method for a friction plate, comprising steps of:
    obtaining a core plate and a friction member of a predetermined shape by punching;
    roughing and cleaning a surface of the core plate;
    coating adhesive on at least one of the core plate and the friction member;
    putting the core plate and the friction member on each other via the adhesive;
    drying and curing the adhesive after putting the core plate and the friction member on each other; and
    conducting a main adhesion by heating and pressuring the core plate and the friction member which are put on each other via the adhesive,
    wherein the step of drying and curing the adhesive is conducted by high-frequency induction heating which is performed on the core plate which contacts with the adhesive.

2. The manufacturing method for a friction plate as set forth in claim 1, wherein the high-frequency heating is arranged such that an interval relative to the core plate which contacts with the adhesive is from 5 to 500 mm, an output of thereof is from 1 to 300 KW, the frequency thereof is from 20 to 300 KHz and the high-frequency heating time is from 4 to 6 seconds.

3. The manufacturing method for a friction plate as set forth in claim 1, wherein the step of putting the core plate and the friction member on each other via the adhesive is conducted before the step of drying and curing the adhesive.

4. The manufacturing method for a friction plate as set forth in claim 1, wherein when the step of coating the adhesive on the core plate and the step of drying and curing the adhesive are defined as a coating-drying-curing step, the coating-drying-curing step is repeatedly conducted for each one surface of the core plate, and
    a step of inverting the core plate, in which one surface of the core plate has been conducted the step of coating and the step of drying and curing, is conducted between the coating-drying-curing steps.

5. The manufacturing method for a friction plate as set forth in claim 1, wherein both surface of the core plate are coated with the adhesive.

6. The manufacturing method for a friction plate as set forth in claim 2, wherein the step of putting the core plate and the friction member on each other via the adhesive is conducted before the step of drying and curing the adhesive.

7. The manufacturing method for a friction plate as set forth in claim 2, wherein when the step of coating the adhesive on the core plate and the step of drying and curing the adhesive are defined as a coating-drying-curing step, the coating-drying-curing step is repeatedly conducted for each one surface of the core plate, and further comprising a step of inverting the core plate, in which on one surface of the core plate there has been conducted the step of coating and the step of drying and curing, said inverting being conducted between the coating-drying-curing steps.

8. The manufacturing method for a friction plate as set forth in claim 2, wherein both surfaces of the core plate are coated with the adhesive.

* * * * *